Jan. 13, 1925.

M. B. FIELD 1,523,110

LIQUID LEVEL GAUGE

Filed Jan. 14, 1921

2 Sheets—Sheet 1

INVENTOR
Michael Birt Field
by Wright, Brown, Quimby & Lacey
att'ys

Jan. 13, 1925.

M. B. FIELD

LIQUID LEVEL GAUGE

Filed Jan. 14, 1921

1,523,110

2 Sheets-Sheet 2

INVENTOR
Michael Brit Field
by Wright, Brown, Quinby Thay
Att'ys

Patented Jan. 13, 1925.

1,523,110

UNITED STATES PATENT OFFICE.

MICHAEL BIRT FIELD, OF GLASGOW, SCOTLAND, ASSIGNOR TO PNEUMERCATOR COMPANY, OF NEW YORK, N. Y., A CORPORATION OF MAINE.

LIQUID-LEVEL GAUGE.

Application filed January 14, 1921. Serial No. 437,301.

*To all whom it may concern:*

Be it known that I, MICHAEL BIRT FIELD, a subject of the King of the United Kingdom of Great Britain and Ireland, and residing at Glasgow, Scotland, have invented a certain new and useful Improvement in Liquid-Level Gauges, of which the following is a specification.

This invention relates to an improved apparatus for ascertaining at a distant station the position of the plane of demarcation between two immiscible liquids in a tank or other vessel filled with such liquids, or for ascertaining the weight, height or volume of either or both liquids in the tank or other vessel, or the total weight of the liquid contents of such tank or vessel.

For the purpose of explanation I shall describe the invention as adapted for ascertaining the position of the plane of demarcation of fuel oil and sea water contained in a compensated fuel tank in a submarine having provision for admission of sea water to take the place of fuel oil as the latter is expended. I shall further assume that the fuel oil is lighter than sea water or occupies the upper portion of the tank.

The invention involves the application of the principle disclosed in the specification of Letters Patent No. 1131412 in which the measurement is effected by a measurement of the air pressure necessary to force the liquid out of an immersed balance chamber or chambers.

Figures 1, 2:
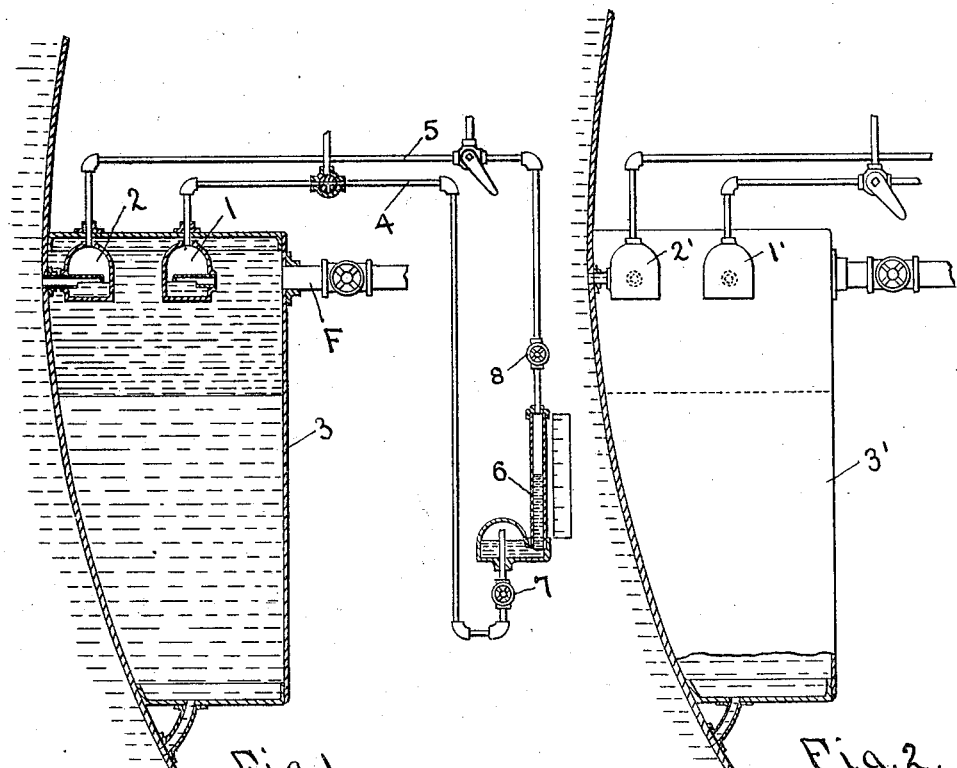
Figure 4:
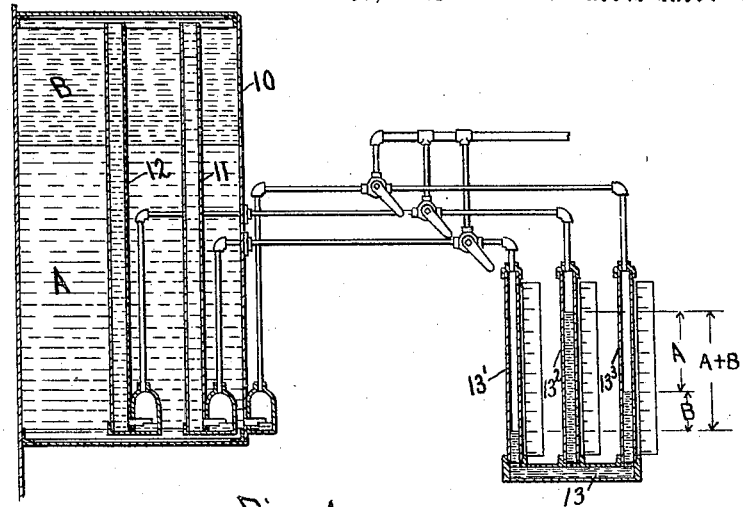
Figure 5:
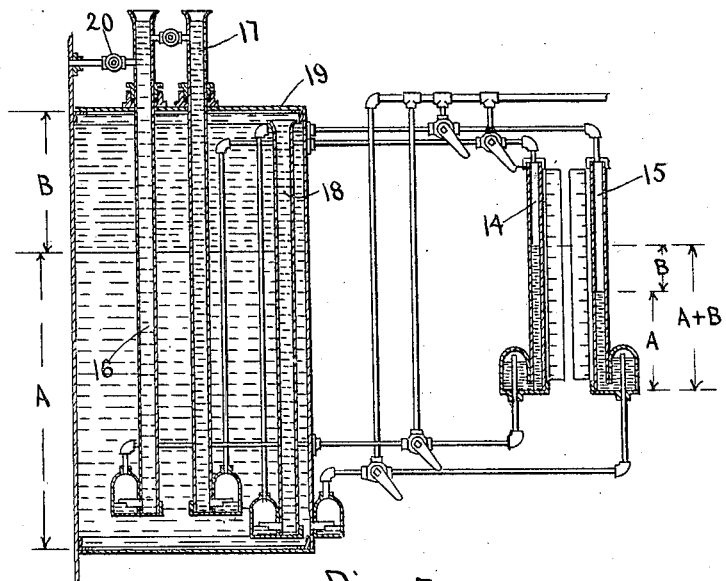

In the accompanying drawings Fig. 1 is a diagrammatic elevation showing one simple embodiment of the invention. Fig. 2 is a diagrammatic elevation and Fig. 3 a plan of a modification. Figs. 4 and 5 are diagrammatic elevations showing two further modifications.

In the embodiment of the invention shown in Fig. 1 there are employed two balance chambers 1, 2 at the same level, both chambers being located within the tank 3 near the upper end thereof and with their orifices approximately level with the fuel draw-off pipe F, the chamber 1 being open to the interior of the tank 3 and the chamber 2 open at its bottom to the sea water outside the tank.

From the chambers 1, 2 are led tubular connections 4, 5 to the ends of a differential gauge 6 having cocks 7, 8 one on each side with air connections, not shown, and constructed and arranged to operate substantially as described in the specification of Letters Patent No. 1131412. The gauge 6 serves in effect to measure the difference of head of a column of sea water equal in height to the height of the balance chamber orfices above the bottom of the tank and of the column of sea water and oil below the orifice of the balance chamber 1 as it exists in the tank.

The conclusion above stated follows from the fact first that the gauge 6 indicates the difference between the pressures existing in the two balance chambers, and second that these pressures differ from one another according to the height of the plane of demarcation. The pressure in the balance chamber 2 is that due to the depth of submergence of the inlet to this chamber below the surface of the sea, and is less than that at the bottom of the tank by an amount equal to the head of a column of sea water equal in height to the vertical distance from the bottom of the tank to the orifice of the balance chamber; while the pressure in the balance chamber 1 is equal to that due to the depth of submergence of the bottom of the tank 3, less the pressure of the layer of water in the tank, and less further the pressure of the layer of oil superposed on the water layer. Hence the difference between the pressures in the two balance chambers is that expressed above. Evidently when the tank is full of oil, the difference is a maximum, and when it is full of water the difference vanishes. The position of the gauge indication between zero and the maximum is, therefore, a measure of the height of the demarcation plane.

Figure 3:
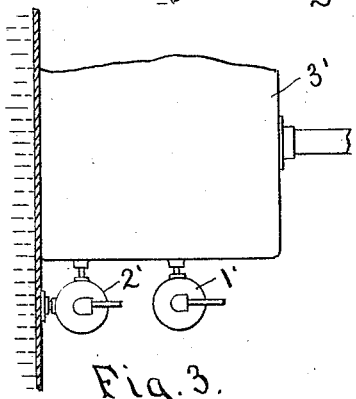

In the modification shown in Figs. 2 and 3 both balance chambers 1', 2' are located outside the tank 3', the chamber 1' having a connection to the interior of the tank 3' and the chamber 2', at the same level, being piped to the sea.

In other respects the arrangement shown in Figs. 2 and 3 agrees with that shown in Fig. 1.

The embodiments shown in Figs. 1 to 3 are based on the principle of measuring the difference of fluid pressure of a column of sea water equal in height to the tank and of the column of oil and sea water as it exists inside the tank. (For convenience of explanation it is assumed that the fuel draw-off pipe and the orifices of the balance chambers are at the level of the top of the tank.)

If we call the depth of the water layer A and that of the oil layer B, the specific gravity of sea water $S_1$, and that of the oil $S_2$, we may otherwise express the said pressure difference as the fluid pressure of a column of fluid of height B and specific gravity $(S_1-S_2)$.

To effect measurement by the apparatus shown in Figs. 1 to 3 a knowledge of the value $(S_1-S_2)$ is presupposed.

The difference $S_1-S_2$ may be small in comparison with $S_1$ and $S_2$, as, for example, when oil of a specific gravity of 0.95 is employed, in which event a small change in $S_1$ or $S_2$ produces a large relative change in $(S_1-S_2)$ and the resulting measurement is correspondingly affected.

This drawback is overcome by the modifications now to be described.

In these modifications I provide two or more manometers preferably of the fluid column type, which indicate at least two of the following pressures: that of a column of height A and specific gravity $S_1-S_2$, that of a column of height B and specific gravity $S_1-S_2$, that of a column of known height, which may be that of the tank, and of specific gravity $S_1-S_2$. Any two of these measurements are sufficient for the determination of A and B, the tank height being of course known; the result being independent of the values of $S_1$ and $S_2$.

In the modifications shown in Fig. 4 I provide inside the tank 10 two standpipes 11, 12 extending from the bottom to the top. The lower ends of these standpipes are closed, and their upper ends are in communication with the tank contents. The standpipe 11 is filled with sea water or fluid of the same specific gravity as that of the layer A; the pipe 12 is filled with oil constituting the layer B.

The pressures existing at the lower ends of the standpipes 11, 12 as also the pressure at the bottom of the tank 10 are transmitted by gaseous medium such as air to the limbs of a 3-legged U-tube 13 containing a suitable quantity of liquid, 13' denotes the leg connected to the sea water column; $13^2$ denotes the leg to which the oil column is connected; the leg $13^3$ is connected to the tank. It will be evident that the liquid in the three legs will stand at various heights such that the difference of height of the columns $13^3$ and 13' represents the height B, and the difference of $13^2$ and $13^3$ represents the height A to the scale in which A—B or the tank height is represented by the difference of $13^2$ and 13'.

It will be observed that the difference of $13^2$ and $13^3$ represents the pressure head A $(S_1-S_2)$ while the difference of $13^3$ and 13' represents the pressure head B $(S_1-S_2)$.

The reasons for the conclusions last stated may be briefly explained thus. The pressure exerted on the leg $13^3$ from the balance chamber to which said leg is connected is that due to the depth of submergence of the entrance from the tank to said balance chamber; in this case assumed to be the tank bottom.

Then the pressure exerted on the leg $13^2$ is equal to the same pressure, less the pressure of the water layer A, less the pressure of the oil layer B, plus the column of oil in the standpipe 12. Since the pressure due to the depth of submergence acts equally on both legs, it cancels out when differences are considered; and since the oil layer B outside the standpipe balances an equal height of oil in the upper part of the standpipe the net pressure difference is that between the layer A of water and a column of oil of the same height. The layers of oil and water in the tank transmit the pressure due to submergence to the top of the column in the standpipe; but as these layers have weight themselves they diminish the pressure transmitted by the amount due to their respective heights and specific gravities.

By like reasoning the pressure transmitted to the leg 13' is seen to be that due to the depth of submergence of the bottom of the tank, less the pressure of the water layer A, less the pressure of oil layer B, and plus the pressure of the water column in the standpipe 11. The pressure due to submergence acting on both legs 13' and $13^3$ cancels out, and the column of water in the standpipe up to the demarcation plane balances the layer A of water outside the standpipe, leaving as the effective pressure difference only that between the column of water in the standpipe of height B and the layer of oil in the tank of height B. Between the legs 13' and $13^2$ the pressure difference is quite obviously the difference between the water column in the standpipe 11 of height A plus B and the oil column in standpipe 12 of the same height.

If any variation should occur in the specific gravity of either liquid, without any change in the height of the demarcation plane, the height of the indicating columns would change. But in every case the proportion of the gauge column differences A and B to the heights of the layers A and B, respectively, in the tank will remain the same; and the difference A plus B between the columns in the legs 13' and $13^2$ is the measure of the tank height, no matter what the absolute value of this column difference may happen to be; wherefore the position of the column in $13^3$ between the levels of the columns in 13² and 13', respectively, is in every case a true measure of the demarcation plane in the tank.

In a regular straight sided tank B $(S_1-S_2)$ represents the change of weight per unit of tank cross sectional area, of the total tank contents compared with the weight when the tank is full of water while A $(S_1-S_2)$ represents the change of weight per unit of tank cross sectional area compared with the weight when the tank is full of oil. Thus by applying suitable calibration scales to the column differences 13³—13' and/or 13²—13³ measurements of the change of weight of tank contents may be made as oil is replaced by water or vice versa.

In the construction shown in Fig. 5 I employ two manometers or gauge tubes 14, 15, and three standpipes 16, 17, 18. The standpipes 16, 17 preferably to the height of the tank 19 are filled respectively with sea water and with oil. These are open to the atmosphere in the submarine or other vessel at their upper ends. The standpipes may enter the tank through liquid-tight joints so as to be immersed in the tank contents for the greater part of their length and thus provide for equality of temperature conditions.

The standpipe 18 filled with oil is contained wholly within the tank, being of a length approximately equal to the tank height, and open at the upper end to the tank contents.

The pressures at the lower ends of the standpipes 16, 17 are transmitted by air medium to the manometer 14, so that it indicates the difference of such pressures, and the pressures at the bottom of the standpipe 18 and at the bottom of the tank 19 are transmitted to the manometer 15 in like manner, so that it also indicates the difference of said pressures.

The manometer 15 then indicates the height of the water layer A to the same scale as the manometer 14 indicates the tank height.

It will be understood that the manometer column 15 represents the pressure head A $(S_1-S_2)$. Thus, as explained heretofore, by applying a suitable calibration scale to the manometer 15, the change of weight of the tank contents as oil is drawn off and replaced by water may be indicated and measured.

Various means may be employed to flood the standpipes.

It is important that the fluid contents of the standpipes shall be of the same specific gravity as the water and oil in the tank.

The standpipes 16, 17 may be interconnected, as shown, above the level of the water column and a small excess of oil may be added so as to prevent evaporation of the water column. The pipes being interconnected, the free oil level will be the same in each and the excess will not introduce inaccuracy.

A pet cock 20 may be provided in the standpipe 16 for the purpose of ensuring that the water stands at the desired level.

In Figure 5 the standpipe 18 is equivalent to the standpipe 12 shown in Figure 4; but any equivalent of the standpipe 11 filled with water and exposed to the pressure existing in the tank is omitted; however, the latter column may be applied to the modification shown in Figure 5 and connected with a differential gauge otherwise the same as the gauge 15, or combined with a three legged gauge as shown in Figure 4.

Either of the means shown in Figures 4 and 5 for ascertaining the difference between the specific gravities of the two liquids may be applied to the particular combination shown in Figures 1, 2 and 3 with essentially the same effects as described in connection with Figures 4 and 5.

For the purpose of the above description it has been assumed that the oil is lighter than water. Where the converse is the case, the necessary inversions may be introduced without departure from the spirit and principle of the invention.

For simplicity of explanation the liquids are herein referred to as water and oil. The invention is equally applicable, however, for ascertaining the position of the plane of demarcation between other immiscible liquids.

In intances it is found that a quantity of water is present as a layer at the bottom of an oil tank, where the remainder of the tank may be only partly filled with oil and it is desired to ascertain the depth of such water layer. It will be understood that the methods hereinbefore disclosed permit of the measurement of A $(S_1-S_2)$ while a subsidiary gauge connecting to two stand pipes of known height filled with water and with oil, respectively, will provide a measurement of K $(S_1-S_2)$ where K is the known height, so that A is determinable by comparison.

I claim:—

1. The combination with a tank filled with two liquids which are non-miscible and are of respectively different specific gravities, and being under pressure from an external source of one of the liquids tending to enter the tank, of an apparatus for indicating the height of the demarcation plane between the liquids, comprising a differential gauge, pipe lines containing a gaseous medium and so connected with said gauge that the latter is caused to indicate the difference between the pressures existing in the different lines, and balance chambers connected to the terminals of the lines, one of which chambers is in communication with the tank at a point where the pressure imposed thereon is that due to the pressure imposed at the bottom of the tank by the external pressure minus the weight of the tank contents, while the other is exposed to the same pressure less the weight of a column of one of the liquids of a height substantially equal to that of the tank contents.

2. The combination with a tank filled with two liquids of different specific gravities which are non-miscible and are under pressure from an external source of one of the liquids tending to enter the tank, of means for ascertaining the position of the plane of demarcation between such liquids, including standpipes each extending substantially from top to bottom of the tank and each containing one of the liquids exclusively, balance chambers in communication respectively with each of said standpipes and with the contents of the tank at a level near the bottom of the tank, pipe lines adapted to contain a gaseous medium running from each of said balance chambers, and pressure-responsive gauges to which said pipe lines are so connected, that the pressures confined in the respective lines act in opposition to one another upon the gauges.

3. The combination with a vessel filled with immiscible liquids of respectively different specific gravities, under the pressure of one of such liquids tending to enter the vessel, of balance chambers at the same level, one of which is open to the liquid contents of the tank and the other to a separate body of one of the liquids, means separating said body of liquid from the contents of the tank, a differential gauge constructed to indicate the difference between two pressures, and pipe lines adapted to contain a gaseous pressure transmitting medium, extending from the respective balance chambers and connected to said gauge in a manner causing their contained pressures to be exerted in opposition to one another at the gauge.

4. For ascertaining the position of the plane of demarcation between two non-miscible liquids of different specific gravities in a vessel which is filled by such liquids, an apparatus including differential pressure gauge elements, a balance chamber open to the vessel near the bottom of the latter, standpipes extending substantially throughout the vertical extent of the vessel and at least one of which is open at its top to the interior of the vessel, other balance chambers open respectively to the standpipes at approximately the level of the first balance chamber, and tubes for a gaseous medium connected at their respectively opposite ends to the balance chambers and to the gauge elements so as to exert their confined pressures differentially on said gauge elements.

In testimony whereof I have signed my name to this specification in the presence of two subscribing witnesses.

MICHAEL BIRT FIELD.

Witnesses:
    ISABEL ROLLO,
    FLORENCE HOUSTON.